United States Patent Office 3,342,645
Patented Sept. 19, 1967

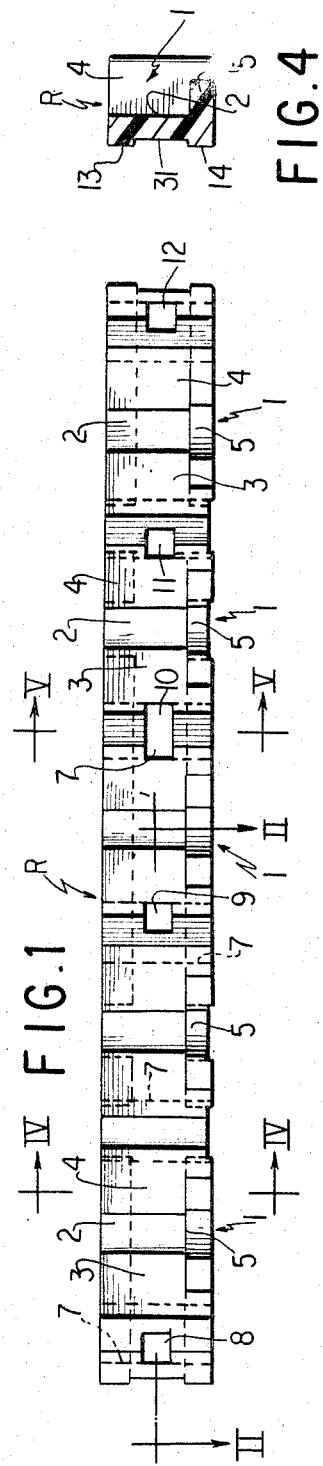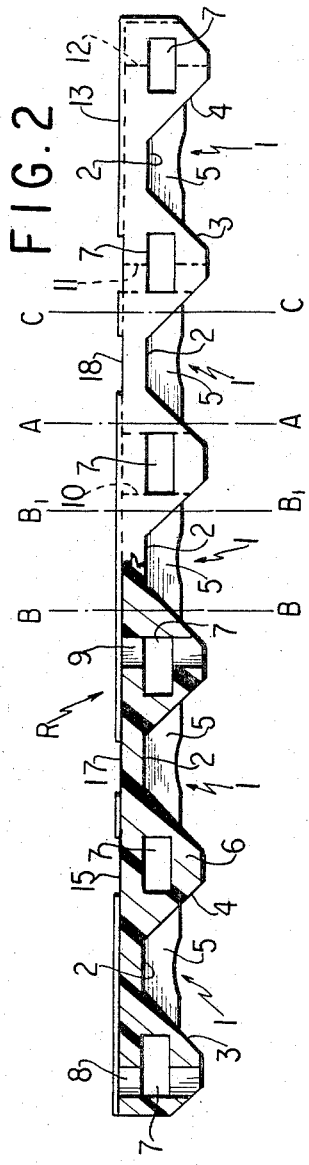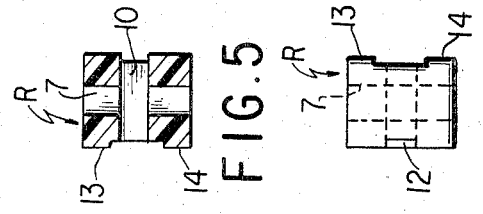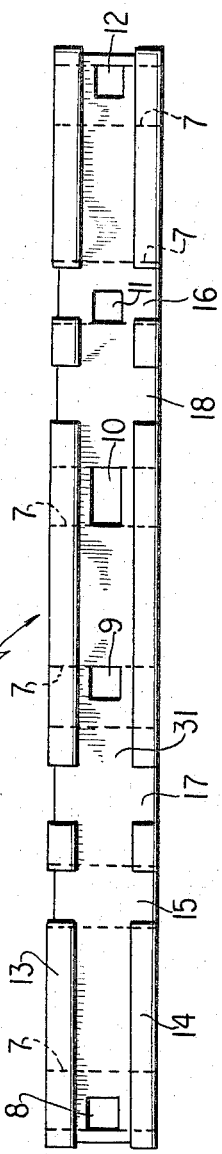

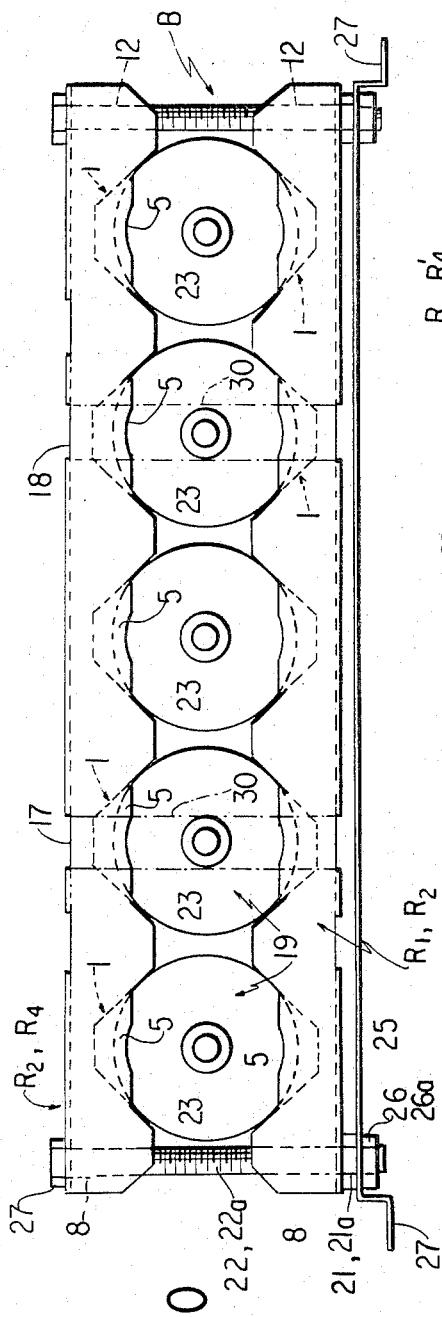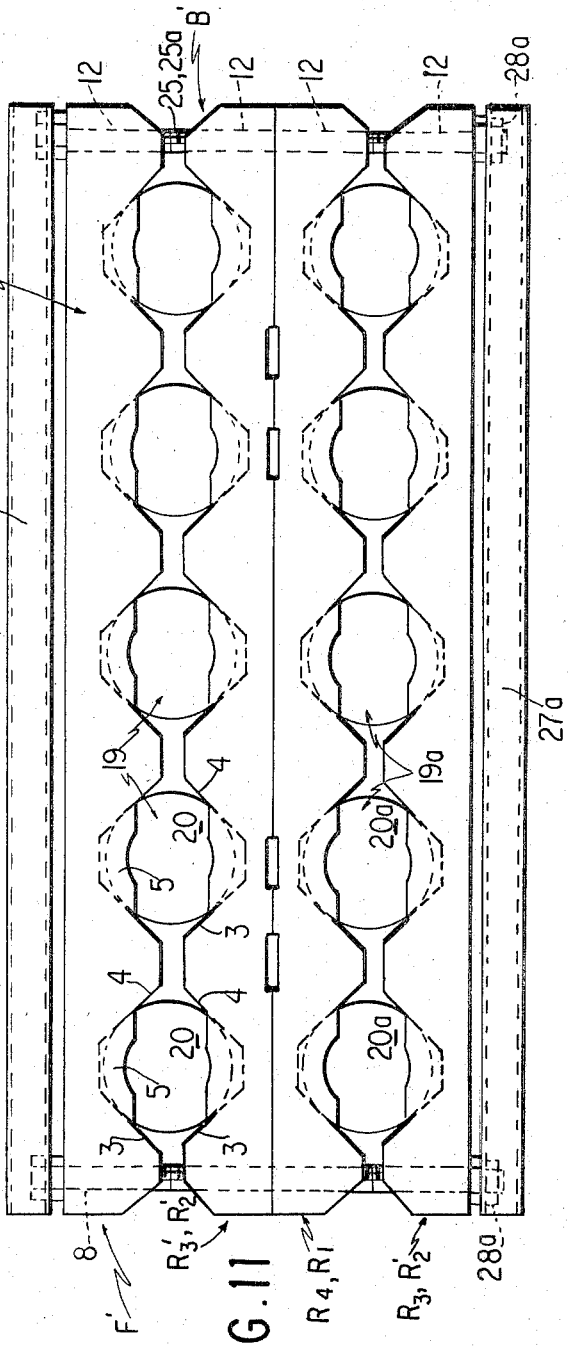

3,342,645
BATTERY OF GALVANIC CELLS AND
MEANS OF ASSEMBLY
Pierre Godard, Livry-Gargan, and Jacques Leon Amand Goix, Vincennes, France, assignors to Societe des Accumulateurs Fixes et de Traction (Société Anonyme), Romainville, France, a company of France
Filed June 2, 1965, Ser. No. 460,710
Claims priority, application France, June 16, 1964, 978,512
10 Claims. (Cl. 136—173)

ABSTRACT OF THE DISCLOSURE

For assemblying cylindrical cells into a battery, rods each having a plurality of spaced prismatic recesses with flared side walls with a ledge in each recess, the rod having vertical and horizontal holes in portions thereof between recesses to receive clamping bolts so that a pair of rods may be clamped around a group of cells at least at one end of the latter, irrespective of the diameters of the cells.

---

This invention relates to batteries of primary or secondary cells and to means for assembling such cells into batteries, and is more especially, though not exclusively, suitable for sealed cylindrical cells.

In an arrangement already known and assigned to the same assignee, it has already been proposed to assemble storage cells into batteries by means of grids, the bars of which provide openings through which the cells are rammed, so that it is possible to keep them sufficiently apart for a cooling fluid to circulate between the cells.

This arrangement has given very good results, more particularly in the case of sealed storage cells in which the overcharging current is converted into heat which has to be dissipated.

It has, however, the drawback that each grid is designed for a given type and size of cell since the cells are rammed through the grid openings. Thus, it cannot be used for cells of different sizes.

At present, the types of primary or secondary cells and more particularly sealed secondary cells, comprise cells, for instance, cylindrical ones, of various differing sizes though standard sizes. It thus is necessary with the known arrangement to provide a stock of different grids for each size and for each number of cells. Such an increase in the number of different grids that must be provided and stored is uneconomical.

Objects and features of this invention are to obviate this drawback by making it possible to assemble batteries comprising any number of cells, the size of which may vary over a large range, by means of assembly parts of a single type only.

According to a feature of the invention, the cells are assembled in a battery by means of rods provided with recesses having outwardly flared walls, said rods being clamped together so that the flared walls of the recesses are pressed against portions of the said cells. As the walls of the recesses are flared outwardly they are adapted to receive, clamp and hold secondary or primary cells of various different sizes and diameters.

By providing two identical rods which are symmetrically positioned with respect to the cells, it is possible to clamp a row of as many cells as there are recesses in each rod. Means are provided for maintaining the relative clamped positions of said rods which are different, depending upon the size of the assembled cells.

As another feature of the invention, it is advantageous but not compulsory to provide a set of rods at the lower part of the cells and another identical set symmetrically placed at the upper part of the cells, each set being spaced from the other set.

The rods also are part of the invention. They may be made of any suitable material, but are advantageously made of a plastic insulating material. If the casing of the cells is made of metal, each is thus held in an insulating setting which eliminates the necessity for a further insulating casing.

The following description in relation to the annexed drawings, given as a non-limitative example, will help in understanding the various features, objects and characteristics of the invention and a mode of realizing them, any disposition found either in the specification or in the drawings being of course part of the invention.

In the drawings:

FIGURE 1 is a front elevational view of a rod embodying the invention;

FIGURE 2 is a partially sectional view of the rod, viewed along line II—II of FIGURE 1 in the left-hand portion and a partially elevational view of the same rod from above in the right-hand portion thereof;

FIGURE 3 is a rear view of the rod of FIGURE 1;

FIGURES 4 and 5 are sectional views respectively taken along lines IV—IV and V—V of FIGURE 1;

FIGURE 6 is an end view of the rod;

Figure 7:
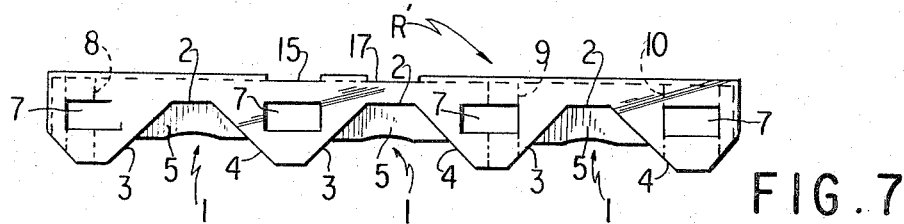
Figure 8:
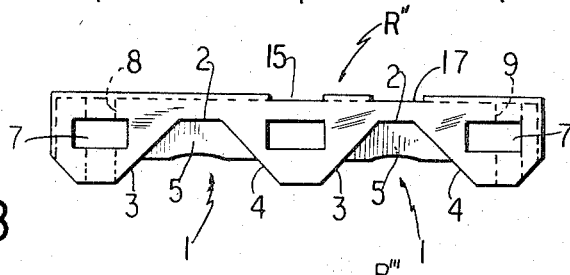
Figure 9:
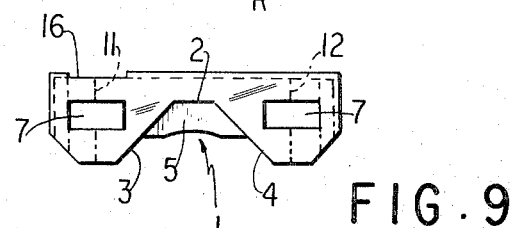
Figures 10A, 11A:
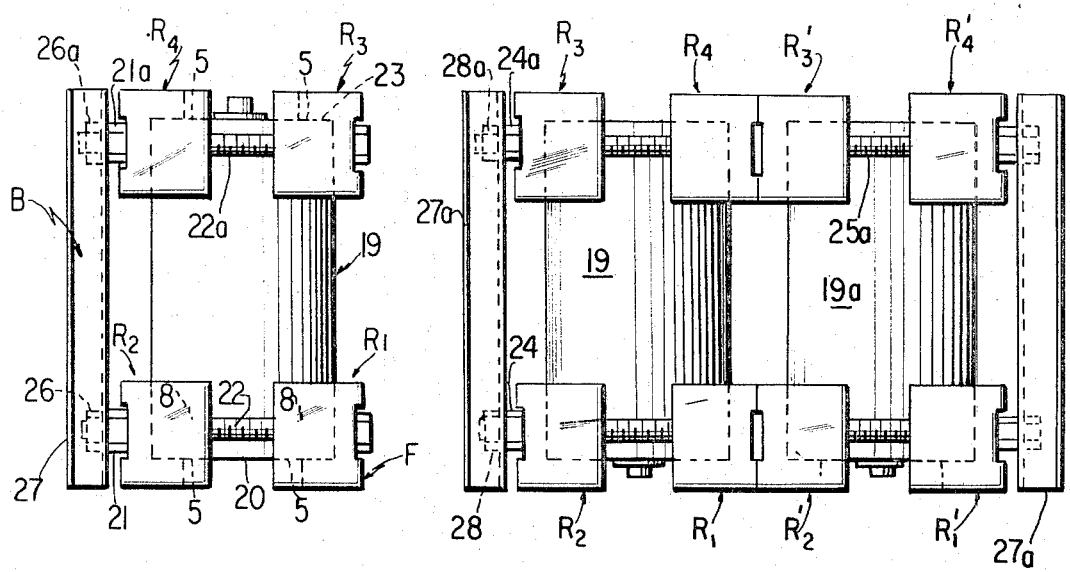

FIGURES 7 and 8 and 9 are views similar to FIGURE 2 showing parts of rod cut from the rod of FIGURE 1 for assembling batteries comprising rods for 3, 2 and 1 cells respectively;

FIGURE 10 is a top plan view of an assembled 5-cell battery embodying the invention;

FIGURE 10a is an end view seen from the right of FIGURE 10;

FIGURE 11 is a view from below of an assembled 10-cell battery, and

FIGURE 11a is an end view seen from the right of FIGURE 11.

Referring to the drawings:

The rod R shown on FIGURES 1 to 6 is made preferably of a molded synthetic resin such as polyethylene that is preferably a low pressure polymerised polyethylene or other suitable insulating material and which is rigid and strong after being molded. This rod R as shown is provided with five prismatic recesses 1, each comprising a rear wall 2 whose plane is parallel to the general axial line of the rod, two outwardly flaring side walls 3, 4, extending at flare angles of 45° from said rear wall 2 and a bottom ledge 5 which extends from rear wall 2 for only a portion of the depth of each recess 1, as seen in FIGURES 2 and 4. The purpose of this bottom ledge 5 will become apparent hereafter.

Each of the thicker body portions 6 of the rod R which laterally define the respective recess 1 is provided with a vertical perforation or a hole 7. Moreover, the rod R is transversely perforated from front to back with five holes 8, 9, 10, 11 and 12 located as shown in FIGURE 1, holes 8 and 12 being situated in each end thick body portions of rod R and holes 9, 10 and 11 being respectively situated in the thick body portions of rod R respectively between the second and third, third and fourth, fourth and fifth recesses. The back face of the rod R comprises at its upper end and lower parts respectively, two outwardly extending shoulders 13 and 14 which are traversed by four vertical grooves 15, 16, 17 and 18 symmetrically placed in pairs 15 and 16, 17 and 18. Grooves 17 and 18 are situated respectively in alignment with the axes of the second and fourth recesses. Grooves 15 and 16 are situated respectively in alignment with the axes of the thick body portions between the first and second, and the fourth and fifth recesses 1. The purpose of said grooves and holes or perforations will become apparent hereinafter.

FIGURE 10 is a top plan view of a battery B comprising only one row of five cells 19 and FIGURE 11 is a bottom plan view of a battery B' comprising two juxtaposed rows each of five cells 19 and 19a. For the sake of simplicity the usual electrical interconnections between have been omitted on both these figures. They are conventional. In both examples, the assembly of the one or a first row of cells 19 is identical. Each cell 19 of such a row, (FIGURES 10, 10a 11 and 11a) is placed between two rods $R_1$ and $R_2$ identical to the rod R of FIGURE 1 and with their recesses 1 facing each other so that each cell bottom 20 rests upon the pair of facing bottom ledges 5 of two oppositely facing recesses 1 and that the lower body part of each cell is positioned between the flaring side walls 3 and 4 of said facing recesses 1. After such positioning of the cells 19, the rods $R_1$ and $R_2$ are clamped together as by nuts 21 and threaded bolts 22 which latter, for example, extend between and through respective aligned end holes 8 and 12 of said rods $R_1$ and $R_2$. These clamped rods $R_1$ and $R_2$ define a rigid surrounding frame about the lower ends of said cells 19. Thereafter, the upper ends 23 of the clamped cells 19 are similarly clamped between a second pair of rods $R_3$ and $R_4$ similar to rods $R_1$ and $R_2$. To this end, such rods $R_3$ and $R_4$ are inverted and their bottom ledges 5 deposited on said upper ends 23 of cells 19 whose upper side parts then rest in the facing recesses 1 of said rods $R_3$ and $R_4$ between their flaring walls 3 and 4. These rods $R_3$ and $R_4$ are clamped by nuts 21a and bolts 22a to define a clamping frame about the upper ends of cells 19 and spaced from the lower frame. This forms a battery B.

If the battery B', as seen in FIGURES 11 and 11a, is to comprise two rows of cells 19 and 19a, the two rows of cells are juxtaposed. To this end, lower rods $R_1$ and $R_2'$ and upper rods $R_4$ and $R_3'$ are positioned back to back as shown in FIGURE 11a. The lower rods $R_2$, $R_1$ and $R_2'$, $R_1'$ and the four upper rods $R_3$, $R_4$ and $R_3'$, $R_4'$ having then been assembled at the cell ends as described regarding rods $R_1$, $R_2$ and $R_3$, $R_4$ are clamped against the cells 19 and 19a by means of nuts 24, 24a and threaded bolts 25, 25a, passing through holes 8 and 12 of said rods. The threaded bolts 25 and 25a may also be used for fastening the batteries B or B' to a suitable mounting member or plate. In FIGURE 10, the threaded bolts 22 and 22a are fastened by nuts 26 and 26a to plate 27 which is spaced from the battery by nuts 21 and 21a. In FIGURE 11, the flange 27a of a mounting member are clamped against rods $R_2$ and $R_3$ by nuts 28a.

Cells such as 19 and 19a are then held together by the rods $R_1$, $R_2$, $R_3$, $R_4$, $R_1'$, $R_2'$, $R_3'$, $R_4'$ not only in both directions of a horizontal plane by being clamped between flaring side walls 3 and 4 of the recesses 1 of said rods but also vertically by being clamped between bottom ledges 5 of the said upper and lower rods.

As may be seen in FIGURES 10 and 11, the flared disposition of walls 3 and 4 of recesses 1 makes it possible to provide a tight and effective hold on differently diametered cells 19 because with different diameters different portions of the flaring sides will engage such walls. In the example shown, the rods are so dimensioned that cylindrical cells of any diameter between 25 to 35 mm. can be assembled in a battery.

Apart from, instead of, or in addition to the threaded bolts 22 and 22a, the batteries may be encircled either by vertical tightening bands 30 (FIGURE 10) located in the grooves such as 17, 18, or 15 and 16, and/or by horizontal tightening bands (not shown) passed around the rods and located in grooves 31 of FIGURES 3 and 4 and located between shoulders 13 and 14. The rods can also be vertically tightened by means of bolts (not shown) passing through holes 7 when the batteries are not fastened to a mounting member or plate.

In assembling batteries comprising several rows of cells, if desired, some of the rods located between the rows could be omitted or replaced by plainer parts. For instance, in FIGURE 11, rod $R_2'$ could be omitted, cells 19a then lying against the back of rod $R_1$; a body or band of rigid material could also be used instead of rods $R_1$ and $R_2'$.

The described rod R of FIGURES 1–5 can be cut along lines A—A, B—B, or C—C of FIGURE 2 in order to constitute rods R', R" and R'" of different lengths respectively with three recesses 1 (FIGURE 7), two recesses 1 (FIGURE 8) or one recess 1 (FIGURE 9). A rod R' according to FIGURE 7 and a rod R'" according to FIGURE 9 may be readily obtained by cutting rod R of FIGURE 2 along lines A—A and C—C; and two rods R" according to FIGURE 8 may be readily obtained by cutting the rod $R_1$ according to FIGURE 2 along lines B—B and $B_1$—$B_1$. Thus, single rod R only need be stored and cut if necessary, as needed.

Then batteries comprising rows of any number of cells comprised between 1 and 5 may be assembled from needed rods R', R" or R'" by cutting rods R as needed. FIGURES 7, 8 and 9 show that the cut rods R', R" and R'" comprise a distribution of holes 8, 9, 10 (FIGURE 7) or 8, 9 (FIGURE 8) or 11, 12 (FIGURE 9) and of grooves 15, 17 (FIGURES 7 and 8) or 16 (FIGURE 9) so that all the assemblies of desired batteries hereinabove described can be effected. This is the reason for arranging the holes or perforations and grooves in the precise manner indicated hereabove in relation to FIGURES 1 to 6.

The rods R are preferably made of an insulating material. Thus, the metal casings of individual sealed cells can be left uncovered, which promotes their cooling by circulating air or other liquid or gas. It is essential that the rods R be very rigid. Excellent results have been obtained by molding them, using low pressure polyethylene. However, other insulative rigid synthetic or other suitable materials could, of course, be used, or the rods could even be made of metal and coated with an insulating synthetic or other suitable material.

It is well understood that the described embodiments are only examples and could be modified more especially by substituting equivalent tetchnical means within the scope of the claims without departing from the invention. The shape of the outwardly flared recesses, too, could more particularly be modified. There is no intention of limitation to the exact disclosure herein presented.

What is claimed is:

1. A battery comprising a plurality of electric cells, a pair of rods each having flared prismatic recesses defined by a plane parallel with the axial length of the rod and oppositely flaring planes intersecting said first-named plane facing each other positioned at at least one end of each of said cells and also having ledges in said recesses for abutment with said end of each of said cells, and means for clamping said rods together against said cells to maintain them rigidly as a battery.

2. The battery of claim 1 wherein said rods are of insulating material.

3. The battery of claim 2 wherein said insulating material is polyethylene.

4. The battery of claim 1 wherein a second pair of like rods is positioned at the other ends of each of said cells, and means for clamping said second pair of rods together against said cells.

5. The battery of claim 4 including tying members encircling said clamped rods.

6. For assembly into a battery, a rod having a plurality of spaced-apart prismatic recesses with a wall parallel with the axial length of the rod and with oppositely flared side walls intersecting said wall at spaced-apart locations and a projecting ledge in each recess, said rod having vertical and horizontal holes in portions thereof between recesses.

7. For assembling cells in a battery, a rod according to claim 6 including a horizontal groove and vertical grooves in faces thereof for receiving encircling tying members.

8. For assembling cells in a battery, a rod according to claim 7 wherein said vertical grooves are distributed so that the rod may be severed to provide any desired number of recesses and the severed portions then each having grooves to receive encircling tying members.

9. For assembling cells in a battery, a rod having five vertical spaced-apart recesses in a side wall thereof and a partial end abutment wall in each recess, the rod having a horizontal hole in the thicker portion between adjacent recesses except in the thicker portion between the first and second recesses and having a vertical groove in its face behind each of the second and fourth recesses and a groove behind each of the thick portions between the first and second recesses and between the fourth and fifth recesses.

10. For assembling cells in a battery, a rod according to claim 9 which is severable into different desired lengths having desired numbers of said recesses in each length.

References Cited

UNITED STATES PATENTS

| | | |
|---|---|---|
| 948,111 | 2/1910 | Magna. |
| 1,651,753 | 12/1927 | Dayes. |
| 2,003,134 | 5/1935 | Bowman. |
| 2,360,978 | 10/1944 | Putter _____ 211—74 |

WINSTON A. DOUGLAS, *Primary Examiner.*

D. L. WALTON, *Assistant Examiner.*